United States Patent
Odagiri

[15] 3,652,362
[45] Mar. 28, 1972

[54] HOT MELT ADHESIVE BONDING PROCESS FOR CORRUGATED PAPERBOARD

[72] Inventor: Saburo Odagiri, Yokohama-shi, Japan

[73] Assignee: Toyo Mokuzai Kigyo Kabushiki Kaisha, Otaru-shi, Hokkaido, Japan

[22] Filed: June 2, 1969

[21] Appl. No.: 829,742

[30] Foreign Application Priority Data

June 4, 1968 Japan........................43/38208

[52] U.S. Cl..................156/321, 156/320, 156/332, 156/311
[51] Int. Cl..........................................C09j 5/06
[58] Field of Search................156/241, 320, 321, 322

[56] References Cited

UNITED STATES PATENTS

| | | | |
|---|---|---|---|
| 2,224,370 | 12/1940 | Wescott | 156/322 |
| 3,232,813 | 2/1966 | Newton | 156/320 |
| 3,432,372 | 3/1969 | Avot | 156/322 |
| 3,471,357 | 10/1969 | Bildasas | 156/241 |
| 3,518,142 | 6/1970 | Dooley | 156/322 |

Primary Examiner—Reuben Epstein
Attorney—Waters, Roditi, Schwartz & Nissen

[57] ABSTRACT

A bonding process in which a first material is coated with a hot melt adhesive which is heated to 1.5–1.7 times its melting temperature. The coated first material is then cooled to 0.6–0.7 times said melting point and then a second material which is heated to a temperature of 1–1.2 times the melting point of the adhesive is pressed against the coated first material.

2 Claims, No Drawings

HOT MELT ADHESIVE BONDING PROCESS FOR CORRUGATED PAPERBOARD

BACKGROUND OF THE INVENTION

1. Field of the Invention

This invention relates to a bonding process utilizing a hot melt adhesive and is more particularly directed to a process of manufacturing corrugated cardboard using a hot melt adhesive.

Description of the Prior Art

It has been heretofore proposed that, in manufacturing corrugated cardboard, a hot melt adhesive be used instead of the conventional starch paste. As for the conventional processes using a hot melt adhesive, there are two processes. One of the two processes is such that a molten hot melt adhesive is applied to a single face and immediately thereafter a liner is placed thereon in order that the two be bonded together. The other process is such that a molten hot melt adhesive previously applied to a single face is solidified by being allowed to stand and cool, then a liner is placed thereon and they are heated together, whereby the solidified hot melt adhesive is again molten for bonding them together. The first process is so defective that when the piled layers of the single face and the liner are slid out of position from one another, the hot melt adhesive is transferred from the exposed side edge portion of the single face to the pressing plate and its adhesion thereto results in hampering the function of the plate. The second process is so defective that not only is there the danger that the single face and the liner will be dried to excess, but also, the process requires, in addition to a hot melt adhesive melting and applying apparatus, an apparatus for placing and heating the liner, which results in the process being disadvantageous from the viewpoint of the necessary manufacturing apparatus.

SUMMARY OF THE INVENTION

According to the invention, two separate layers or sheets are bonded together by a process in which a hot melt adhesive is first molten and applied to a first of said layers. The molten adhesive is allowed to stand and cool whereby it is partially solidified. Then, the second of said layers, which is preliminarily heated is pressed against the first layer having the partially solidified adhesive whereby the two layers are bonded together.

DETAILED DESCRIPTION OF THE INVENTION

This invention has as an object to overcome the defects in the conventional processes which are noted above. This is accomplished by using a different process from those noted above.

According to this invention, a hot melt adhesive which is molten by heating is applied to a first material to be bonded, and then said adhesive is partly solidified by allowing same to stand and cool, then a second material which is to be bonded to the first material is preliminarily heated and pressed against said first material so that the two are bonded together.

In greater detail, the application of the hot melt adhesive to the first material is affected by selecting the most suitable working temperature for the application purpose (namely, a temperature of 1.5 to 1.7 times the melting point of the hot melt adhesive) taking into account the bonding strength thereof, the economy of the amount used and the working efficiency thereof. Then, this hot melt adhesive is intentionally cooled to a predetermined temperature, before being bonded to a second material for affording a suitable margin for the progress of work and the apparatus, and by this intentional cooling (to a temperature of 0.6 to 0.7 times the melting point of the hot melt adhesive) there is effectively prevented any transferred adhesion of the hot melt adhesive to the pressing plate. Moreover, in accordance with such cooling, the temperature of the second material to be bonded is raised, whereby direct reheating of the hot melt adhesive itself as in the conventional case is avoided and the desired strength of bonding is effected at the point where the two layers are piled on one another and at the same time the cooled temperature of the hot melt adhesive is never substantially raised at the point where the two layers are not piled atop one another, thereby insuring that there occurs no transfer of adhesive to the pressing plate. The temperature of the second material is a temperature of 1.0 to 1.2 times the melting point of the hot melt adhesive and such temperature falls within the range in which the materials are not dried to excess.

This invention will now be explained in even greater detail as follows:

The first material to be bonded, that is, a single face for a corrugated paper board is in a normal temperature condition, and a hot melt adhesive is applied thereto at a working temperature of 1.5 to 1.7 times its melting point. The hot melt adhesive at this temperature is in the most suitable viscosity condition for applying the proper amount thereof.

After this application, according to the invention, the coated first material is cooled for 1 to 3 seconds before the single face is bonded to a second material to be bonded, that is, a liner, Specifically, the temperature of the hot melt adhesive on the single face at the time of placing the liner upon same for bonding is lowered to a temperature of 0.6 to 0.7 times the melting point of the adhesive. This temperature falls under such a viscosity range that the hot melt adhesive cannot transfer to the pressing plate during the subsequent pressing stage. This transfer, of course, also has a relation to the temperature of the pressing plate itself, but the transfer substantially never occurs if the temperature of the pressing plate is kept at least at a temperature of 0.1 to 0.2 times the melting point of the adhesive, as long as the hot melt adhesive is within the above-mentioned temperature range and in a fairly hard viscosity condition. To keep it at a normal temperature is necessary but this can be effected by means of a simple apparatus, so that it is very advantageous from the viewpoint of apparatus.

The temperature of the second material to be bonded, that is, that of the liner is determined in relation to the above-mentioned lowered temperature of the hot melt adhesive. Namely, the whole of the liner is heated to a temperature such that, at the heated portion thereof in contact with the lowered temperature hot melt adhesive, said adhesive is molten and in an instant exhibits its strong bonding strength. According to the results of an experiment described hereinafter, the temperature is found to be a temperature of 1.0 to 1.2 times the melting point of the hot melt adhesive.

If the bonding is carried out under the foregoing temperature control, a good and instant bonding can be effected and accordingly such subsequent process steps as a pressing process and a cooling process can be extremely shortened. Further the product is very excellent and the amount of use of the hot melt adhesive which is comparatively high in cost can be diminished to the lowest possible degree and the practicality of the invention can be fully recognized also from an economical point of view.

One embodying example of this invention will now be explained as follows, and while a particular adhesive is mentioned therein, it will be apparent to those skilled in the art that any hot melt adhesive may be used as well, so long as the critical temperature relationships and conditions specified above are satisfied.

The hot melt adhesive used in this Example is "KH-134" which has a melting point of 85° – 90° C. and a viscosity of about 2,000 to 2,500 c.p.s. at 150° C. The components thereof can be listed as follows:

| | |
|---|---|
| Ethylene-vinyl acetate copolymer resin | 20 to 35% by weight |
| Rosin and its derivatives | 35 to 50% by weight |
| Waxes | 20 to 30% by weight |
| Extenders | 10 to 25% by weight |

This adhesive is applied to a single face of paper (K. 200 gr. manufactured by Honshu Seishi Co. Ltd.) at a working temperature of 150° ± 5° C. The applied amount (gr. per m.²) of this adhesive in the case when the single face is 5 cm. × 10 cm. was measured and the results thereof are as shown in Table I.

TABLE I

No. 1, 13.8 gr.; No. 2, 10.0 gr.; No. 3, 8.2 gr; No. 4, 10.8 gr.; No. 5, 10.4 gr.; No. 6, 9.6 gr.; No. 7, 11.0 gr.; Mean, 10.6 gr.

The hot melt adhesive applied to a single face (4.5 cm.× 9 flutes) is given a predetermined open time (cooling time), and at this condition the single face is pressed for a predetermined time by means of a wooden piece, having a weight of 500 gr. placed thereon, against a liner (6.0 cm. × 9 cm, K. 220 gr. manufactured by Honshu Seishi Co. Ltd.) previously heated to a predetermined temperature. Each product thus obtained is torn off by hand to observe the bonded condition. The results thereof are shown in Table II.

TABLE II

| Liner °C. | Open Time sec. | Pressing Time by 500 gr. weight (sec.) | | | | | | | | | | | | |
|---|---|---|---|---|---|---|---|---|---|---|---|---|---|---|
| | | 0 | 2 | 4 | 6 | 8 | 10 | 1 | 2 | 14 | 16 | 18 | 20 | 30 40 |
| 105±5 | 1 | | | e | e | c | b | a | | | | | | | |
| | | | | e | d | c | a | a | | | | | | | |
| | | | | e | e | c | b | a | | | | | | | |
| | | | | e | d | c | b | a | | | | | | | |
| | | | | e | d | c | b | b | | | | | | | |
| | 3 | | e | e | c | b | b | a | | | | | | | |
| | | | e | e | c | b | b | a | | | | | | | |
| | | | e | e | c | b | a | a | | | | | | | |
| | | | e | d | c | c | a | a | | | | | | | |
| | | | e | e | c | b | b | a | | | | | | | |
| 85±5 | 1 | | | e | d | c | a | | | | | | | | |
| | | | | e | d | b | a | | | | | | | | |
| | | | | e | d | b | a | | | | | | | | |
| | | | | e | d | b | a | | | | | | | | |
| | | | | e | d | b | a | | | | | | | | |
| | 3 | | e | d | c | f | f | b | | | | | | | |
| | | | e | e | fd | f | f | b | | | | | | | |
| | | | e | e | c | f | f | | | | | | | | |
| | | | e | e | fd | f | f | | | | | | | | |
| | | | e | e | fd | f | f | | | | | | | | |
| 65±5 | 1 | | | e | c | d | b | a | | | | | | | |
| | | | | e | c | c | c | a | | | | | | | |
| | | | | e | d | c | b | a | | | | | | | |
| | | | | e | c | c | c | a | | | | | | | |
| | | | | e | c | c | b | a | | | | | | | |
| | 3 | | e f | d | f | fb | | | | | | | | | |
| | | | e | c | f | fb | | | | | | | | | |
| | | | e | c | f | f | | | | | | | | | |
| | | | e f | d | f | f | | | | | | | | | |
| | | | e f | d | f | f | | | | | | | | | |

The judging standards of the pasting strength conditions in Table II are defined as follows:
a. Paper fiber intensively torn off.
b. Paper fiber torn off only at the bonded portion
c. Mixed occurrence of conditions a and b
d. come off with the adhesive being spread though not being stringy.
e. completely stringy condition of the adhesive.
f. Inferior bonding because of a lowering of the temperature
The above data can be simplified as shown in Table III.

TABLE III

| Liner Temperature °C. | 105±5 | 85±5 | 65±5 |
|---|---|---|---|
| Open Time sec. | 1  3 | 1  3 | 1  3 |
| Bonded condition | a  a | a  f | a  f |

It can be seen from the above that if a liner temperature of 105° ± 5° C. is selected, the open time can be anywhere within the wide range from 1 to 3 sec. and yet the bonded condition is good.

The influence on the paper quality on the liner temperatures was tested. When the liner temperature is raised, the moisture contained in the liner is evaporated. The conditions thereof are as shown in Table IV.

TABLE IV

| Liner Temperature | Moisture content in liner before heating % | Moisture content in liner after heating % |
|---|---|---|
| 100° C. | 8.0 | 5.3 |
| | 8.0 | 4.4 |
| | 7.5 | 4.5 |
| 110° C. | 7.7 | 4.3 |
| | 7.7 | 4.8 |
| | 7.6 | 4.1 |
| 120° C. | 7.7 | below 4.0 |
| | 7.7 | below 4.0 |
| | 7.7 | below 4.0 |

Since it is known that the product is not substantially harmed as long as the drying thereof is stopped at about 4.5 percent moisture content, it is permitted to raise the liner temperature up to 105° ± 5° C.

A further experiment was conducted to determine the transfer of the hot melt adhesive to the pressing plate. The results thereof are shown in Table V.

TABLE V

| Plate temperature | Transfer condition |
|---|---|
| 65° C. | Much transfer. Transfer is caused by merely pressing from above. |
| 40° C. | Transfer is not caused by merely pressing from above but is caused by lateral sliding movement |
| 25° C. | Transfer is caused by lateral sliding movement only where much adhesive is applied |
| 20° C. | No transfer is caused |

The temperature of the hot melt adhesive used in the above experiment is 50° C.

It is clear from the results that no transfer occurs if the temperature of the pressing plate is kept at normal temperature in the case when the temperature of the hot melt adhesive is 50° C. This temperature requires no special cooling apparatus, so that it is very advantageous from the viewpoint of manufacturing apparatus.

According to this invention, as described above, a hot melt adhesive is brought to the most suitable applying conditions but outside the temperature range at which transfer of the adhesive can occur, and the temperature of the second material is raised so as not to reach its excessive drying limit and an instant bonding effect is heightened. The product is of an excellent quality as a result of maintaining these temperature controls and the progress of the work and the apparatus can be extremely simplified.

What is claimed is:

1. A bonding process for manufacturing a double face corrugated paperboard comprising applying a molten hot melt adhesive having a melting point of 85° – 95° C. to a first face of corrugated paper board to be bonded, cooling said molten hot melt adhesive to a temperature of 50° – 70° C., which is, 0.6 – 0.7 times its melting point, whereby the adhesive is partly solidified, placing a liner to be bonded to said first face, said liner being preliminarily heated to a temperature of 90° – 110° C., which is 1.0 to 1.2 times the melting point of the adhesive, on said first face and pressing them together by using a pressing plate cooled to a temperature of 10° – 20° C. which is 0.1 – 0.2 times the melting point of the adhesive, whereby the adhesive reverts to its molten condition to bond them together.

2. A process as claimed in claim 1 wherein the hot melt adhesive is essentially an ethylene-vinyl acetate copolymer resin.

* * * * *